(12) United States Patent
Suzuki et al.

(10) Patent No.: US 9,297,418 B2
(45) Date of Patent: Mar. 29, 2016

(54) SLIDING MEMBER, METHOD FOR PRODUCING SAME, AND METHOD FOR FORMING RESIN COATING FILM

(71) Applicant: SUZUKI MOTOR CORPORATION, Shizuoka-Ken (JP)

(72) Inventors: Nobuyuki Suzuki, Shizuoka-Ken (JP); Akio Hikasa, Shizuoka-Ken (JP)

(73) Assignee: Suzuki Motor Corporation, Hamamatsu-Shi (JP)

( * ) Notice: Subject to any disclaimer, the term of this patent is extended or adjusted under 35 U.S.C. 154(b) by 128 days.

(21) Appl. No.: 14/349,341

(22) PCT Filed: Oct. 3, 2012

(86) PCT No.: PCT/JP2012/075600
§ 371 (c)(1),
(2) Date: Apr. 3, 2014

(87) PCT Pub. No.: WO2013/051591
PCT Pub. Date: Apr. 11, 2013

(65) Prior Publication Data
US 2014/0255656 A1    Sep. 11, 2014

(30) Foreign Application Priority Data

Oct. 5, 2011 (JP) ................. 2011-220617

(51) Int. Cl.
*B32B 3/22* (2006.01)
*F16C 33/20* (2006.01)
*C08L 77/02* (2006.01)
*C08L 79/08* (2006.01)
*C08L 101/00* (2006.01)

(52) U.S. Cl.
CPC ............... *F16C 33/208* (2013.01); *C08L 77/02* (2013.01); *C08L 79/08* (2013.01); *C08L 101/00* (2013.01); *F16C 33/201* (2013.01); *F16C 2208/40* (2013.01); *F16C 2208/60* (2013.01); *F16C 2223/30* (2013.01); *Y10T 428/24612* (2015.01)

(58) Field of Classification Search
CPC ...... F16C 25/02; F16C 33/201; F16C 33/208; F16C 33/6651; Y10T 428/24355; Y10T 428/24372; Y10T 428/2438; Y10T 428/24405; Y10T 428/24479; Y10T 428/24612; Y10T 428/2462; Y10T 428/24802; Y10T 428/24893
USPC ......... 428/102, 103, 141, 143, 144, 147, 156, 428/168, 172, 173, 212, 213
See application file for complete search history.

(56) References Cited

U.S. PATENT DOCUMENTS

| | | | | |
|---|---|---|---|---|
| 5,415,791 A * | 5/1995 | Chou | ................. | C10M 169/04 508/103 |
| 2004/0058828 A1* | 3/2004 | Iwata | ................. | C10M 111/04 508/104 |

FOREIGN PATENT DOCUMENTS

| | | |
|---|---|---|
| JP | H07189804 A | 7/1995 |
| JP | 2002213612 A | 7/2002 |
| JP | 2006320907 A | 11/2006 |
| JP | 2008298144 A | 12/2008 |
| JP | 2010078040 | 4/2010 |
| JP | 2011012767 | 1/2011 |

* cited by examiner

Primary Examiner — Aaron Austin
Assistant Examiner — Megha Gaitonde
(74) Attorney, Agent, or Firm — Barnes & Thornburg LLP

(57) ABSTRACT

A sliding member having a base and a coating on the surface of the base, the coating is formed of a mixed resin obtained by mixing a thermosetting resin and a thermoplastic resin. The mixed resin is a mixture of a thermosetting resin that is in a liquid state before mixing and a thermoplastic resin that is in the form of solid particles. By applying and heat-treating the mixed resin that is in a liquid state, a coating film formed on the surface of the base is a resin coating layer and dimples in the resin surface.

5 Claims, 13 Drawing Sheets

| | SP-500 ADDED AMOUNT [vol%] | | | | | |
|---|---|---|---|---|---|---|
| | 0 | 1 | 3 | 5 | 9 | 17 |
| FRICTION COEFFICIENT [-] | 0.060 | 0.044 | 0.028 | 0.031 | 0.033 | 0.037 |

SP-500 ADDED AMOUNT AND FRICTION COEFFICIENT

SP-500 ADDED AMOUNT AND FRICTION COEFFICIENT

| JIS B0601-1994 | SP-500 ADDED AMOUNT [vol%] | | | | | |
|---|---|---|---|---|---|---|
| | 0 | 1 | 3 | 5 | 9 | 17 |
| Ry:MAXIMUM HEIGHT | 0.47 | 0.64 | 1.05 | 1.72 | 1.90 | 2.81 |
| Rz:10-POINT AVERAGE ROUGHNESS | 0.30 | 0.44 | 0.68 | 1.11 | 1.21 | 1.77 |
| Ra:ARITHMETIC AVERAGE ROUGHNESS | 0.10 | 0.10 | 0.15 | 0.26 | 0.33 | 0.49 |

SP-500 ADDED AMOUNT AND SURFACE ROUGHNESS

SP-500 ADDED AMOUNT AND SURFACE ROUGHNESS

T0=140°C : FLUIDITY LOWERING STARTING TEMPERATURE OF THERMOSETTING RESIN ACCORDING TO SOLVENT VOLATILITY
T1=165°C : FUSING POINT (SP-500) OF THERMOSETTING RESIN
T2=180°C : CURING STARTING TEMPERATURE OF THERMOSETTING RESIN
T3=180°C : HEAT TREATMENT (CURING) TEMPERATURE

| | SP-10 ADDED AMOUNT [vol%] | | | | | |
|---|---|---|---|---|---|---|
| | 0 | 1 | 3 | 5 | 9 | 17 |
| FRICTION COEFFICIENT [-] | 0.060 | 0.047 | 0.030 | 0.030 | 0.031 | 0.044 |

SP-10 ADDED AMOUNT AND FRICTION COEFFICIENT

SP-10 ADDED AMOUNT AND FRICTION COEFFICIENT

| JIS B0601-1994 | SP-10 ADDED AMOUNT [vol%] | | | | | |
|---|---|---|---|---|---|---|
| | 0 | 1 | 3 | 5 | 9 | 17 |
| Ry: MAXIMUM HEIGHT | 0.47 | 0.88 | 1.17 | 1.72 | 2.22 | 3.55 |
| Rz: 10-POINT AVERAGE ROUGHNESS | 0.30 | 0.56 | 0.77 | 1.09 | 1.47 | 2.37 |
| Ra: ARITHMETIC AVERAGE ROUGHNESS | 0.10 | 0.14 | 0.17 | 0.29 | 0.42 | 0.69 |

SP-10 ADDED AMOUNT AND SURFACE ROUGHNESS

SP-10 ADDED AMOUNT AND SURFACE ROUGHNESS

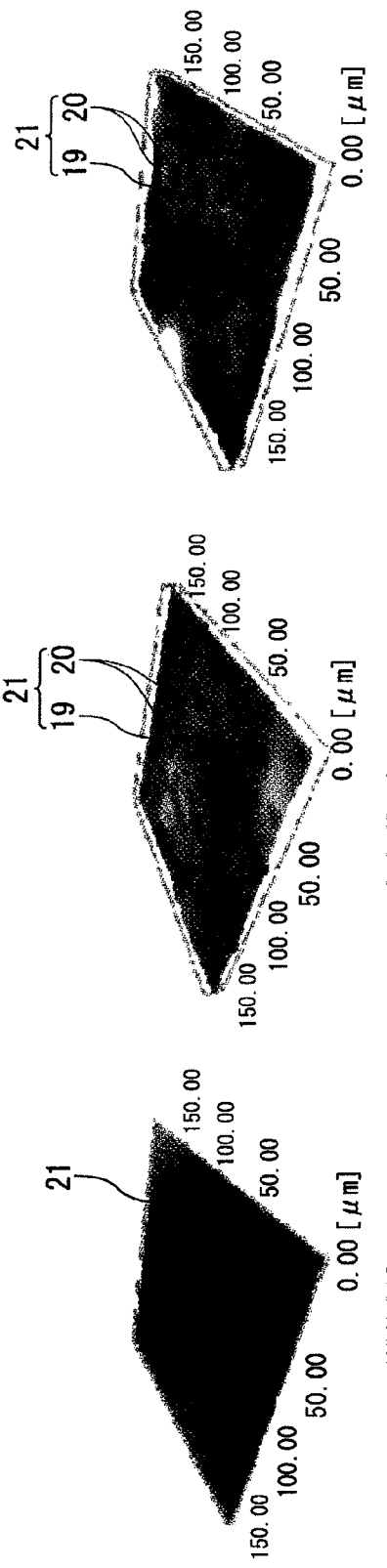
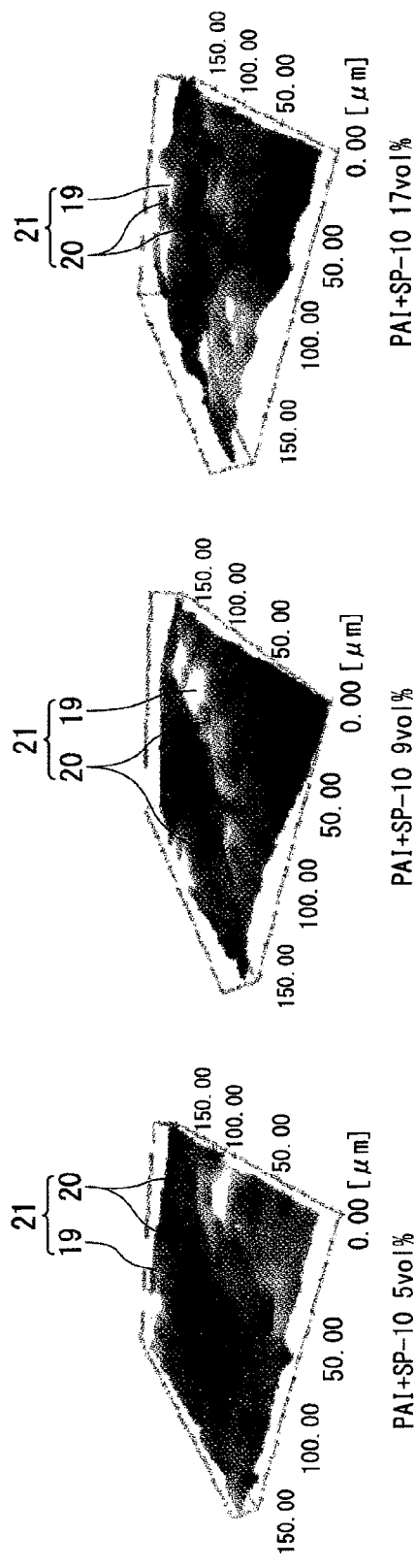
FIG. 10A ONLY PAI
FIG. 10B PAI+SP-10 1vol%
FIG. 10C PAI+SP-10 3vol%
FIG. 10D PAI+SP-10 5vol%
FIG. 10E PAI+SP-10 9vol%
FIG. 10F PAI+SP-10 17vol%

SLIDING MEMBER, METHOD FOR PRODUCING SAME, AND METHOD FOR FORMING RESIN COATING FILM

PRIORITY CLAIM

This patent application is a U.S. National Phase of International Patent Application No. PCT/JP2012/075600, filed 3 Oct. 2012, which claims priority to Japanese Patent Application No. 2011-220617, filed 5 Oct. 2011, the disclosures of which are incorporated herein by reference in their entirety.

TECHNICAL FIELD

The present invention relates to a sliding member having an excellent sliding characteristic under an oil lubrication condition, a method of manufacturing the sliding member, and a method of producing a resin film.

BACKGROUND ART

There is a technology for improving an oil holding capability of a sliding surface to thereby improve wear resistance, seizure resistance, and sliding characteristics thereof by providing very small "indentations" having a size of approximately several micrometers, called microdimples, on a surface of a sliding member such as a bearing, which is a part in an internal combustion engine of a transportation apparatus, a rotating machine, and the like.

As technologies of related art for forming microdimples in a sliding surface of a sliding member, there are known technologies, such as shot peening (Patent Document 1), laser processing (Patent Document 2), a combination of laser processing, etching, and microblasting (Patent Document 3), and a method in which a molding die having a plurality of semi-spherical protrusions arranged thereon is pressed into a resin surface (Patent Document 4).

Further, Patent Document 5 describes a technology for improving adaptivity and durability by providing a sliding member, such as a piston, with a two-layer coating formed of a soft layer and a hard layer made of thermoset (thermosetting) resins, and Patent Document 6 describes a technology for improving wear resistance and seizure resistance of a sliding surface of a sliding member in a transportation apparatus, a rotating machine, and the like by providing the sliding member with very small indentations (recesses, dimples) by laser peening processing to thereby form oil reservoirs.

PRIOR ART DOCUMENTS

Patent Documents

Patent Document 1: Japanese Patent Laid-Open Publication No. 2010-78040
Patent Document 2: Japanese Patent Laid-Open Publication No. 2002-213612
Patent Document 3: Japanese Patent Laid-Open Publication No. 2008-298144
Patent Document 4: Japanese Patent Laid-Open Publication No. 2011-12767
Patent Document 5: Japanese Patent Laid-Open Publication No. 7-189804
Patent Document 6: Japanese Patent Laid-Open Publication No. 2006-320907

DISCLOSURE OF THE INVENTION

Problems to be Solved by the Invention

A sliding part and a rotating part, for example, in a transportation apparatus are in some cases provided with an insufficient amount of oil at a time when a surface pressure becomes high depending on a using (used) condition. Under a boundary and mixed lubrication condition in which it is difficult to form a uniform oil film and hence solid contact tends to occur, the solid contact tends to increase frictional resistance and cause wear and seizure.

From a viewpoint of prevention of the increase in frictional resistance and the occurrence of wear and seizure, there is also provided a technology for not only improving lubrication performance by coating a resin material that provides satisfactory slippage on a sliding member but also further improving wear resistance, seizure resistance, and sliding characteristics of a sliding surface of the sliding member by forming dimples (recesses) in a resin surface of the sliding member.

To form dimples in a resin surface of a sliding member, however, it is necessary to add a dimple forming process after a resin material coating process, which means such a matter that it is necessary to separately provide a dimple forming apparatus, such as a shot blaster and a laser processing apparatus. Further, the prior art provides problems of a difficulty in the formation itself of dimples in a resin surface of a sliding member and a cumbersome and complicated procedure of the dimple forming process.

The present invention has been made in view of the circumstances described above, and an object thereof is to provide a sliding member including a substrate and a film thereon formed of simultaneously dimples and resin coating layer for obtaining an improved wear resistance, seizure resistance, and sliding characteristics, a method of manufacturing the sliding member, and a method of producing a resin film.

Another object of the present invention is to provide a sliding member including a substrate and a film coated thereon and formed of a resin coating layer and dimples simultaneously formed by heat-treating a mixed resin that is a mixture of a thermosetting (or thermoset) resin and a thermoplastic resin having different thermal behavioral characteristics, a method of manufacturing the sliding member, and a method of producing a resin film.

Another object of the present invention is to provide a sliding member including a film readily formed without a dimple forming apparatus by coating a mixture of a thermosetting resin in a liquid form before mixed and a thermoplastic resin in a solid particle form before mixed, the two resins having different thermal behavioral characteristics, and heat-treating a resin coating layer to form dimples therein, a method of manufacturing the sliding member, and a method of producing a resin film.

Means for Solving the Problem

The object of the present invention described above is achieved by providing, in one embodiment, a sliding member including a substrate and a coating on a surface of the substrate, the coating made of a mixed resin being a mixture of a thermosetting resin and a thermoplastic resin, wherein the mixed resin is a mixture of a thermosetting resin in a form of liquid before mixed and a thermoplastic resin in a form of solid particles before mixed, and the liquid-form mixed resin is coated and then heat-treated to thereby form a film formed of a resin coating layer and dimples formed in a resin surface.

In the embodiment described above, it may be preferred that the mixed resin is a mixture produced by uniformly mixing solid particles made of nylon-12 thermoplastic resin in a polyamide-imide-based thermosetting resin.

Further, it may be preferred that the mixed resin coated on the surface of the substrate is heat-treated at a temperature higher than or equal to a melting point of the thermoplastic resin but and higher than or equal to a curing temperature of the thermosetting resin.

Furthermore, it may be preferred that a shape of the dimples formed in the surface of the resin coating layer is defined or determined by a size and a shape of the solid particles of the thermoplastic resin.

Still furthermore, it may be preferred that a distribution of the dimples formed in the surface of the resin coating layer is preferably defined or determined by an amount of solid particles of the thermoplastic resin added.

The solid particles of the thermoplastic resin may desirably have a spherical shape.

A method of manufacturing a sliding member in another embodiment for achieving the object of the present invention includes providing a substrate, coating a mixed resin on a surface of the substrate, the mixed resin being a mixture of a thermosetting resin in a form of liquid and a thermoplastic resin in a form of solid particles, heat-treating the coated mixed resin to form a resin coating layer on the substrate, and cooling the resin coating layer to form dimples in a surface of the resin coating layer acting as a sliding surface of the sliding member.

In the method of manufacturing a sliding member, it is desirable that the mixed resin is a mixture produced by uniformly mixing and dispersing solid particles made of nylon-12 thermoplastic resin in a polyamide-imide-resin thermosetting resin, and that the mixed resin uniformly mixed is heat-treated by heating the mixed resin at a temperature higher than or equal to a melting point T1 of the thermoplastic resin and higher than or equal to a curing temperature T2 of the thermosetting resin.

Further, it may be desired that the temperature at which the mixed resin is heat-treated is higher than or equal to the curing temperature of the thermosetting resin and having a temperature difference from the melting point of the thermoplastic resin of 50° C.

Furthermore, it may be desired that a shape and a size of the dimples formed in the surface of the resin coating layer on the substrate is defined or determined by a shape and a size of the solid particles of the thermoplastic resin.

Still furthermore, it may be desired that a distribution of the dimples formed in the surface of the resin coating layer on the substrate is defined or determined by adjusting an amount of solid particles of the thermoplastic resin to be added.

A method of producing a resin film in a further embodiment for achieving the object of the present invention includes coating a mixed resin in a form of liquid on a surface of a substrate, the mixed resin being a uniform mixture of a thermosetting resin in a form of liquid and a thermoplastic resin in a form of solid particles, heat-treating the coated liquid-form mixed resin to form dimples in a surface of the resin coating layer to form a film including the resin coating layer and the dimples as a sliding surface of the substrate.

Effects of the Invention

In the present invention of the characters mentioned above, a film including a resin coating layer and dimples can be formed only by coating a mixed resin that is a mixture of a thermosetting resin and a thermoplastic resin on a substrate (of a sliding member), followed by a heat treatment, with the dimples automatically provided in a surface of the film on the substrate, thereby obtaining inherent sliding characteristics of the resin work synergistically with an oil holding capability of the dimples, and hence, improving wear resistance, seizure resistance, and sliding characteristics.

The dimples can be formed in a surface of the resin coating layer coated on the substrate of the sliding member automatically and simultaneously with the formation of the resin coating layer without using a dimple forming apparatus, thereby readily forming the film including the resin coating layer with the dimples in a simplified formation process.

Additional features and advantageous effects provided by examples of the present invention will be further apparent by the following description made with reference to the accompanying drawings.

BRIEF DESCRIPTION OF THE DRAWINGS

FIG. 3 shows heat-treated products in Example 1 illustrating a relationship between a friction coefficient and an amount of added thermoplastic resin to be added to a thermosetting resin, in which

FIG. 4 shows the heat-treated products in Example 1 illustrating a relationship between surface roughness and the amount of added thermoplastic resin to be added to the thermosetting resin, in which

FIG. 7 shows heat-treated products in Example 2 illustrating a relationship between the friction coefficient and the amount of added thermoplastic resin to be added to a thermosetting resin, in which

FIG. 8 shows the heat-treated products in Example 2 illustrating a relationship between the surface roughness and the amount of added thermoplastic resin to be added to the thermosetting resin, in which

FIG. 10 shows changes in surface state in accordance with the amount of added SP-10 in a case where SP-10 made of nylon-12 is added as the thermoplastic resin in Example 2, in which FIG. 10A shows a three-dimensional image captured with an AFM showing a surface state in a case where only the thermosetting resin is present and no SP-10 is added, and FIG. 10B to FIG. 10F show AFM three-dimensional images showing surface states in cases where the amounts of added SP-10 are 1 vol %, 3 vol %, 5 vol %, 9 vol %, and 17 vol %.

EMBODIMENT FOR CARRYING OUT THE INVENTION

Figure 1:
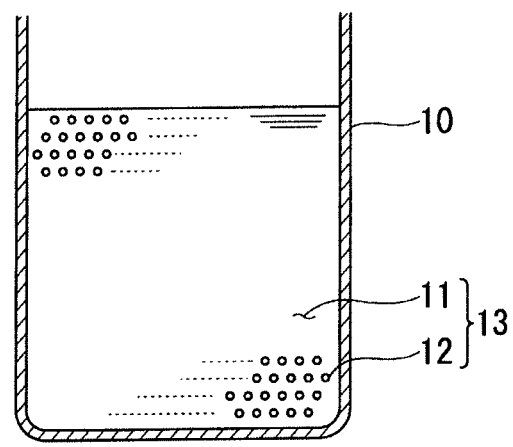
FIG. 1 is an overall view showing a mixed resin that is a uniform mixture of a thermosetting resin and a thermoplastic resin in a container.

An embodiment will be described below in detail with reference to the drawings. Further, it is to be noted that, throughout a plurality of the drawings, same or corresponding portions are denoted with same reference numerals or characters.

[Sliding Member and Film on Substrate of Sliding Member]

The present invention relates to a sliding member such as a piston and a piston ring in an internal combustion engine in an automobile or any other transportation vehicle or apparatus, and to a sliding member such as a rotating mechanical bearing or a sliding part in other movable apparatuses.

An object of the present invention is to reduce object of reducing a friction coefficient of a sliding surface of any of the sliding members and to improve wear resistance, seizure resistance, and sliding characteristics of the sliding surface, and the present invention can achieves the above object by simultaneously forming a resin coating layer and dimples in a film coted on a substrate that is the sliding member without exerting a force or with no use of a dimple forming apparatus in the formation of the dimples in a surface of the film.

A film to be coated on the substrate, which is a sliding member, is formed on the substrate by mixing a plurality of types, for example, two types of thermosetting resin and thermoplastic resin having different thermal behavioral characteristics and heat-treating a mixture. The thus formed film has a large number of dimples spontaneously and automatically formed in a surface of the film. A resin coating layer and dimples can therefore be simultaneously formed in the film on the substrate. The dimples form oil reservoirs and provide an excellent oil holding capability. Each of the thermosetting resin and the thermoplastic resin to be used is not necessarily one type of resin. For example, a plurality of types of thermoplastic resins may be combined with each other for use.

The sliding member according to the present embodiment has a configuration in which the film including the resin coating layer and the dimples is formed on the substrate by coating a mixed resin in a form of liquid in which a mixture of a thermosetting resin and a thermoplastic resin is dispersed on a sliding surface of the substrate to thereby form the resin coating layer with the dimples. These dimples form the oil reservoirs, automatically formed in a surface of the resin coating layer without using any dimple forming apparatus.

On the other hand, resin materials are classified into a thermosetting resin, which cures with heat, and a thermoplastic resin in a solid form, which softens with heat. Many thermosetting resins cure when heated in a heat treatment with a contraction in volume due to cross-linking curing. Thermoplastic resins, particularly, crystalline resins undergo a phase-change from a crystalline form to an amorphous form when heated to melt and hence experience a reversible change in volume.

In the present embodiment, two types of resin, for example, a thermosetting resin and a thermoplastic resin having different thermal behaviors are skillfully combined and mixed with each other, and a mixed resin in a form of liquid is coated on a surface of the substrate. When the liquid-form mixed resin coated on the substrate is then heated (cured) in a thermal treatment to form a film, the film including a resin coating layer and dimples is formed on the substrate automatically. The above fact is a finding of the present invention.

The film formed on the substrate of the sliding member is designed so as to include the resin coating layer and the dimples without using a dimple forming apparatus by coating a mixed resin that is a mixture of a thermosetting resin in a liquid form mixed and a thermoplastic resin in a solid particle form before mixed, followed by heat treatment that allows the dimples to be simultaneously formed in the surface of the resin coating layer on the substrate.

Examples of the thermosetting resin include phenol resins, urea resins, melamine resins, unsaturated polyester resins, allyl resins, epoxy resins, urethane resins, and imide resins.

Further, examples of the thermoplastic resin combined with any of the thermosetting resins described above include polyethylene, polypropylene, polyamide, polyacetal, polybutylene terephthalate, polyethylene terephthalate, poly(phenylene sulfide), liquid crystal polymer, and polytetrafluoroethylene.

As the thermoplastic resin to be used, a thermoplastic resin that softens or melts when heat-treated with a reversible change in volume and can be uniformly dispersed in the thermosetting resin is selected.

The film on the substrate is formed of the resin coating layer and the dimples. A size of the dimples formed in a surface of the thermosetting resin forming the resin coating layer is proportionally correlated to a size of the solid particles of the thermoplastic resin mixed with the thermosetting resin, that is, the two sizes are closely related to each other. The above fact is another finding of the present invention.

The solid particles of the thermoplastic resin to be used therefore have a size on the order of sub-micrometers to micrometers. Specifically, the solid particles of the thermoplastic resin have an average particle diameter ranging, for example, from several micrometers to several hundreds of micrometers, preferably 10-odd micrometers. Shape and particle diameter of the particles of the thermoplastic resin are not limited to particular ones, but they affect the shape and size of the dimples in the film on the substrate. The particles therefore preferably have a spherical shape. When the solid particles have a spherical shape, the dimples formed in the surface of the film on the substrate can be substantially circular, which allows the thermoplastic resin, when mixed with the thermosetting resin, to be satisfactorily dispersed.

<Method of Manufacturing Sliding Member>

An embodiment of a method for manufacturing a sliding member will next be described.

The present embodiment shows a procedure of manufacturing a sliding member used in an internal combustion engine or a rotating machine, and a resin coating layer is formed on a surface of the sliding member and dimples is also formed simultaneously with the resin coating layer.

Resin materials to be coated on the surface of the sliding member include a thermosetting resin, which cures with heat, and a thermoplastic resin, which softens with heat. The present embodiment relates to a method of manufacturing a sliding member having a substrate and a resin coating layer formed thereon by coating a mixed resin in which a mixture of two types of resin is dispersed, that is, specifically, a thermosetting resin and a thermoplastic resin having different thermal behaviors, mixed at a necessary volume ratio, followed by heat treatment not only to form the resin coating layer on the substrate but also to produce dimples in a surface of the resin coating layer simultaneously with the formation of the resin coating layer.

The thermosetting resin is, for example, a polyamide-imide resin, an imide resin, or an epoxy resin in a form of liquid before mixed with the thermoplastic resin. A thermosetting resin to be used is accompanied by a contraction in volume in many cases when it cures in a thermal treatment.

On the other hand, the thermoplastic resin to be mixed with the thermosetting resin is a polyamide resin, a polyethylene resin, or a mixed polymer in a form of solid particles, preferably, spherical solid particles having a size ranging from several micrometers to several tens of micrometers.

Thermoplastic resins, particularly, crystalline resins undergo a change from a crystalline form to an amorphous form when heated to melt and hence experience a reversible change in volume.

In the present embodiment, as a first stage of the procedure of manufacturing the sliding member, a thermosetting resin 11 in a form of liquid is mixed with a thermoplastic resin 12 in a form of solid particles in a container 10 in such a way that the thermoplastic resin 12 is uniformly dispersed in the thermosetting resin 11, and a resultant mixture is accommodated in the container 10, as shown in FIG. 1. To uniformly disperse the solid-particle-form thermoplastic resin 12 having a size ranging from several micrometers to several tens of micrometers in the liquid-form thermosetting resin 11, an agitator, a kneading mixer (neither of them is shown), or any other similar apparatus is used to form a mixed resin 13 in a form of liquid as a whole. An organic solvent, such as N-methyl-2-pyrolidone (NMP) or gamma-butyrolactone (GBL), is added to the liquid-form mixed resin 13 to adjust viscosity of the thermoplastic resin 12.

On the other hand, the thermoplastic resin 12 needs to be solvent resistant against the solvent (N-methyl-2-pyrolidone (NMP) or gamma-butyrolactone (GBL), for example), which is used to dilute the liquid-form thermosetting resin 11. Further, the thermoplastic resin 12 desirably has a spherical shape in consideration of dispersion of the solid particles in the thermosetting resin 11, and a disperser or a stabilizer for stabilizing the solid particles and even an antiformer that prevents bubbles from being produced when the liquid-form mixed resin is coated may be used as appropriate.

The size of the microdimples formed in a surface of the thermosetting resin is closely related to the size of the dispersed solid particles, specifically, they are proportionally correlated with each other. The thermoplastic resin 12 is selected so that the solid particles have a size on the order of sub-micrometers to micrometers. An average size of the solid particles (average particle diameter) is selected appropriately, for example, from values ranging from several micrometers to several tens of micrometers.

Figures 2A, 2B:
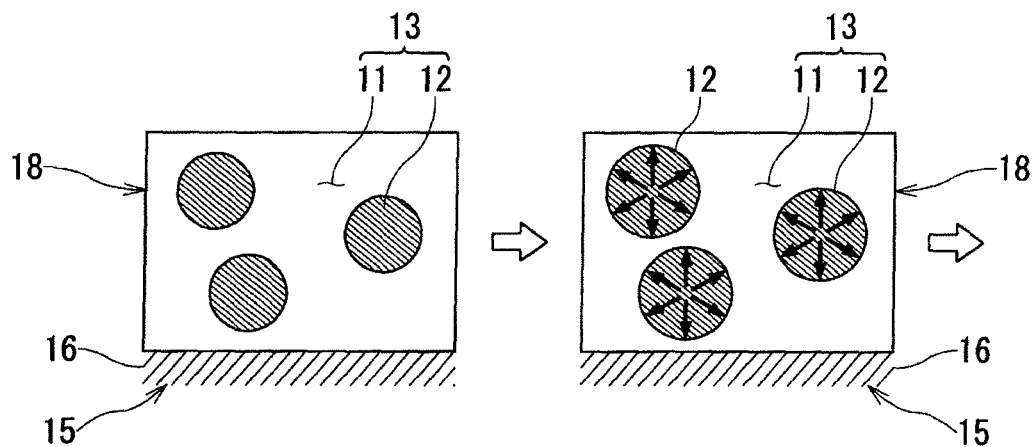
FIGS. 2A to 2D show a procedure of manufacturing a resin coating layer formed by coating a mixed resin on a substrate of a sliding member, followed by a heat treatment, and also show a dimple formation mechanism.

As a second stage, the liquid-form mixed resin 13, which is the mixture of the liquid-form thermosetting resin 11 and the solid-particle-form thermoplastic resin 12, is then coated on a surface of a substrate 16 of a sliding member 15 as shown in FIG. 2A by using application, spraying, stencil printing, or any other suitable method. According to such coating operation, a liquid-form mixed resin film 18, having a uniform thickness ranging from about several micrometers to several tens of micrometers, is formed.

The substrate 16 is made of a material that is thermally stable at a temperature higher than a heatproof temperature of the thermosetting resin 11, for example, a steel-based material or an aluminum-based material. When adherence between the substrate 16 and the liquid-form mixed resin 13 is insufficient, a contact surface area may be increased by forming irregularities on the surface of the substrate, or a surface treatment may be performed on the surface of the substrate.

As a third stage, after the liquid-form mixed resin 13 is coated on the substrate 16 to form the liquid-form mixed resin film 18, a heat treatment is performed so as to heat the liquid-form mixed resin film 18 to a temperature higher than or equal to a melting point (dissolution point) T1 of the thermoplastic resin 12. The heat treatment raises a temperature of the thermoplastic resin 12 beyond the melting point T1 to cause the solid particles to undergo thermal expansion, as shown in FIG. 2B.

Figures 2C, 2D:
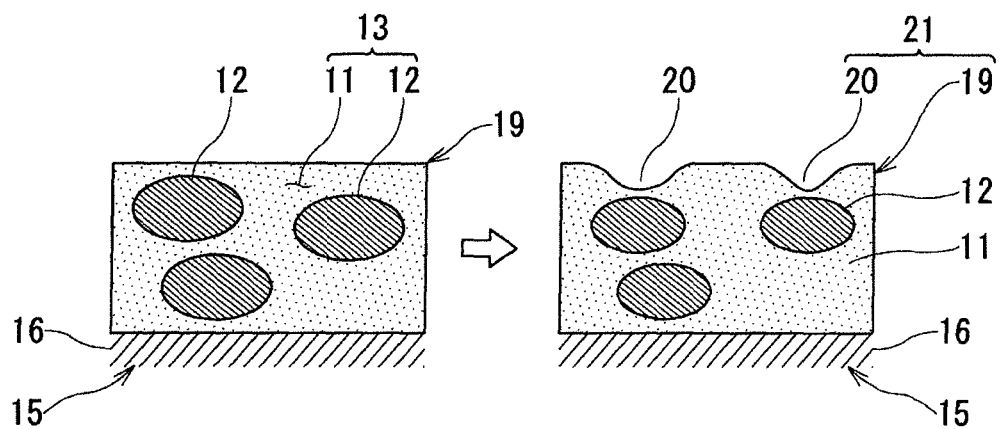

Subsequently, another heat treatment is performed at a temperature higher than or equal to the melting point T1 of the thermoplastic resin 12 and higher than or equal to a curing (start) temperature T2 of the thermosetting resin 11, as shown in FIG. 2C, to initiate curing of the thermosetting resin 11 with a contraction in volume accompanied by the solidification. The contraction in volume accompanied by the curing of the thermosetting resin 11 changes force balance, resulting in voluminal deformation of the thermoplastic resin 12.

Thereafter, when the mixed resin coated on the surface of the substrate 16 is cooled, the reversible change in volume (contraction) of the thermoplastic resin 12 reduces the volume thereof, and part of the surface of the thermosetting resin is pulled from the inside. An effect of tensile stress produced by the thermoplastic resin 12 results in formation of a film 21 of the liquid-form mixed resin 13 formed on the substrate 16, as shown in FIG. 2D. The film 21 on the substrate 16 is formed of a resin coating layer 19 and a large number of (micro) dimples 20 and forms a sliding surface of the sliding member 15. A size and shape of the dimples 20 are substantially correlated with the size and shape of the solid particles of the thermoplastic resin.

In view of the process described above, as the thermosetting resin 11, a resin is desirably selected so as to cure at a temperature equal to or slightly higher than the melting point T1 of the thermoplastic resin 12 with a temperature difference being lower than or equal to 50° C. This is because when the curing process is carried out at a temperature greatly higher than the melting point T1 of the thermoplastic resin 12, for example, a temperature higher than the melting point T1 by 50° C., the fluidity of the thermoplastic resin 12 increases, making it difficult to maintain an original shape of the thermoplastic resin 12 in the thermosetting resin 11, resulting in deformation of the dimples formed in the surface of the thermosetting resin 11.

FIG. 2 (FIGS. 2A to 2D) shows a heat treatment condition under which the liquid-form mixed resin 13 is coated on the surface of the substrate 16 of the sliding member 15 and a mechanism of the formation of the (micro) dimples.

In the method of manufacturing a sliding member according to the present embodiment, the liquid-form mixed resin 13 to be used is a mixture of the liquid-form thermosetting resin 11 and the solid-form thermoplastic resin 12 mixed at a necessary volume ratio.

At first, the uniformly mixed, liquid-form mixed resin 13 is coated on the surface of the substrate 16 of the sliding member 15 to a necessary fixed thickness to thereby form the liquid-form mixed resin film 18 on the substrate 16 as shown in FIG. 2A, and then, the liquid-form mixed resin 13 is heated to a temperature higher than or equal to the melting point T1 of the thermoplastic resin 12 to cause the thermoplastic resin 12 to undergo thermal expansion as shown in FIG. 2B.

While the heating to a temperature higher than or equal to the melting point T1 causes the solid particles of the thermoplastic resin 12 to undergo thermal expansion, the heating to a temperature higher than or equal to the curing start temperature T2 of the thermosetting resin 11 causes a phase change of the thermosetting resin 11 from liquid to solid, as shown in FIG. 2C, followed by curing of the thermosetting resin 11 resulting in a contraction in volume, which compromises the force balance in the thermoplastic resin 12 and the solid particles deform while undergoing the thermal expansion.

Next, when the natural or forced cooling is undergone, the solid particles experience a reversible change in volume and the volume thereof contracts. When the solid particles are cooled to a temperature lower than or equal to the melting point T1, the solid particles of the thermoplastic resin 12 solidify due to the reversible change in volume, resulting in a contraction in volume and deformation. Thus, a part of the surface of the thermosetting resin 11 is pulled from the inside by the inner solid particles. The thermoplastic resin 12 thus exerts tensile stress.

As a result, the microdimples 20 are automatically formed in the resin coating layer of the film 21, specifically, in the surface of the thermosetting resin, that is, the surface of the resin coating layer 19, as shown in FIG. 2D. The film 21 formed of the resin coating layer 19 and the microdimples 20 is thus produced on the substrate 16. The film 21 coated on the substrate 16 in a heat-treating (i.e., curing) process has a thickness ranging, for example, from about 5 to 20 μm.

Specific examples of the method of manufacturing a sliding member will next be described.

Example 1

Example 1 shows a case where a polyamide-imide resin, which is highly thermally stable after thermally cured and excels in slidability irrespective of high temperature, was used as the thermosetting resin 11 and N-methyl-2-pyrolidone was dissolved as a primary solvent in the polyamide-imide resin. A thermal curing temperature of the thermosetting resin 11 depends on a composition thereof, and the thermosetting resin 11 was selected so that the curing temperature thereof is relatively low and the thermosetting resin starts curing at 180° C.

As the thermoplastic resin 12, which is mixed with and dispersed in the thermosetting resin 11, solid particles made of nylon-12 (manufactured by TORAY INDUSTRIES, INC.) (grade: SP-500, average particle diameter: 5 μm) were used. In one case, no solid particle of the thermoplastic resin 12 was added, and in another case, the solid particles of the thermoplastic resin 12 were added by 1, 3, 5, 9, and 17 vol %. FIGS. 3 and 4 show results of the relationship of a friction coefficient and surface roughness with respect to an amount of added SP-500, which were measured with a ball-on-disk tester.

Figures 3A, 3B:
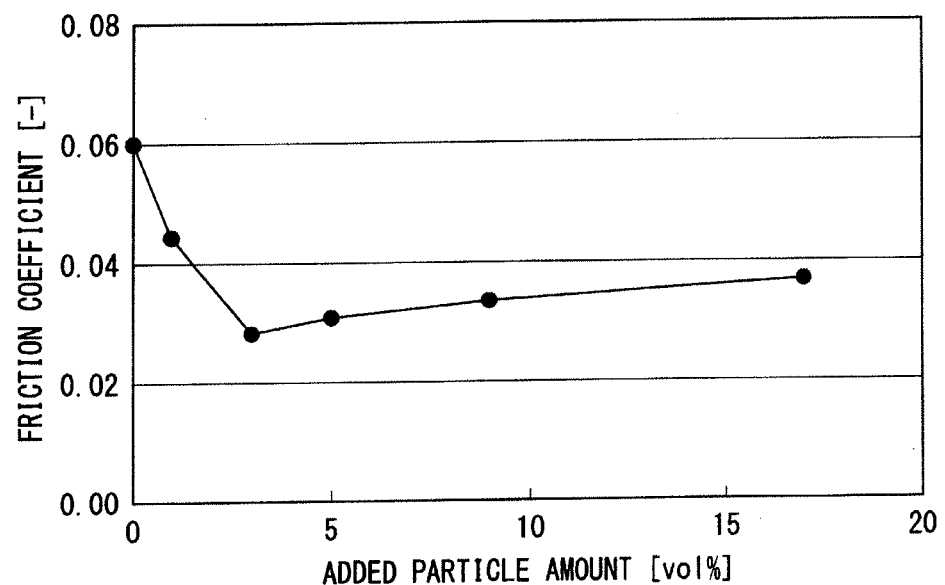
FIG. 3A shows a table containing a relationship between a measured friction coefficients and an amount of added SP-500 made of nylon-12 manufactured by TORAY INDUSTRIES, INC. as the thermoplastic resin.
FIG. 3B shows a graph along which the measured values in FIG. 3A are plotted.

FIG. 3A shows measured values of the friction coefficient with respect to the amount of added SP-500, and FIG. 3B shows a graph representing the measured values.

FIG. 3 (FIGS. 3A and 3B shows that adding SP-500 by an amount greater than or equal to 3 vol % provides a smaller friction coefficient and hence more excellent sliding and slippage characteristics than those obtained when no SP-500 was added.

Figures 4A, 4B:
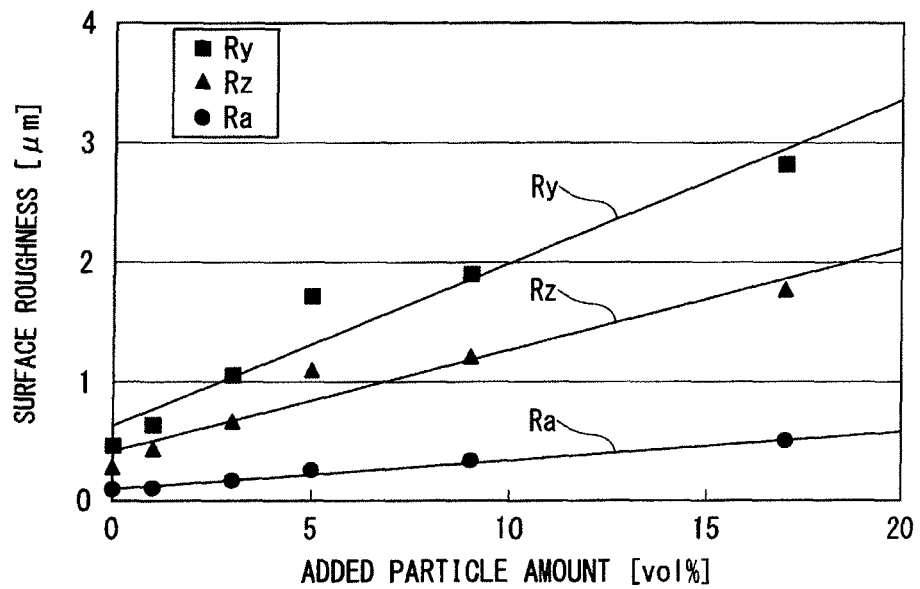
FIG. 4A shows a table containing a relationship between a measured surface roughness and the amount of added SP-500 made of nylon-12 as the thermoplastic resin.
FIG. 4B shows graphs along which the measured values in FIG. 4A are plotted.

FIG. 4 represents a relationship between the amount of added SP-500 and the surface roughness based on a JIS (B0601-1994) standard. FIG. 4A is a table containing measured values of the surface roughness with respect to the amount of added SP-500, and FIG. 4B shows graphs representing the measured values.

FIG. 4 (FIGS. 4A and 4B) shows that the surface roughness, specifically, a maximum height (Ry), 10-point average roughness (Rz), and an arithmetic average roughness (Ra) increase in substantially linear proportion to the amount of added solid particles of the thermoplastic resin.

Next, as another specific example, there will be described a case where the SP-500-graded spherical solid particles were added by 9 vol % as the thermoplastic resin 12 made of a nylon-12 resin, which is mixed with and dispersed in the thermosetting resin 11 made of the polyamide-imide resin, followed by a heat treatment.

The solid particles of the thermoplastic resin 12 were substantially spherical solid particles having a melting point ranging from 165 to 171° C., an average particle diameter of 5 μm, and a bulk density ranging from 3.5 to 5.0 cc/g.

The liquid-form mixed resin 13 produced by adding the solid particles of the thermoplastic resin 12 having an average particle diameter of 5 μm by 9 vol % to the thermosetting resin 11 made of the polyamide-imide (PAI) resin and by mixing the two resins in such a way that the solid particles were dispersed in the thermosetting resin, which was then applied on the substrate 16 of the sliding member 15, for example, an iron substrate, followed by two types of heat treatment.

Figure 5:
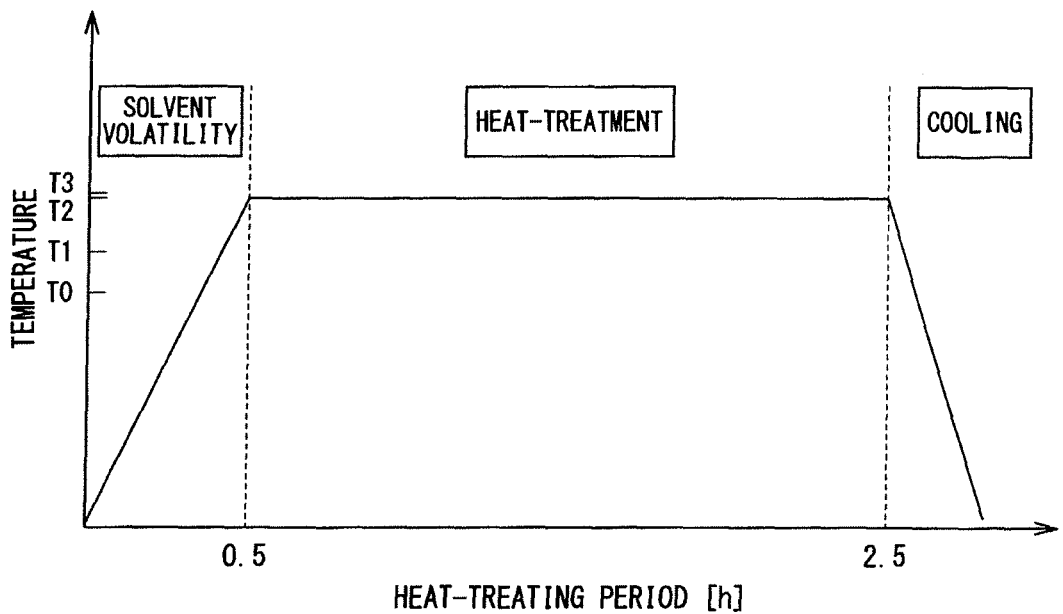
FIG. 5 shows a heating pattern in a mixed resin heat treatment in Example 1 performed in a method of manufacturing a sliding member.

One of the heat treatments was a two-hour heat treatment at 140° C. (heat-treating process), and the other heat treatment was a two-hour heat treatment (i.e., curing) in which heat-treatment was performed at 180° C. (T3) as shown in FIG. 5. Herein, this heat-treating process may be called as curing process.

In the case where the liquid-form mixed resin 13 in Example 1 was heat-treated for two hours at 180° C. (T3), microdimples formed in a resin surface were observed under a SEM (scanning electron microscope) even when the heat-treating period was 10 minutes. However, when the heat-treating period is 10 minutes, since the polyamide-imide (PAI) resin of which the thermosetting resin 11 is made does not completely cures, it is required as a necessary heat-treating period to be desirably at least 30 minutes. Further, physical characteristics of the resin do not change even when the resin is heated for a heat-treating period longer than or equal to two hours, and it does not therefore make sense to further increase the heat-treating period. Hence, it will be said that a heating period of at least 30 minutes suffices to form the microdimples 20 at the heat-treating temperature of 180° C.

On the other hand, (1) in the heat treatment for two hours (heat-treating period) at 140° C., no dimple was formed in the surface of the resin coating layer made of the mixed resin, and the surface of the resin coating layer remained smooth.

Figure 6:
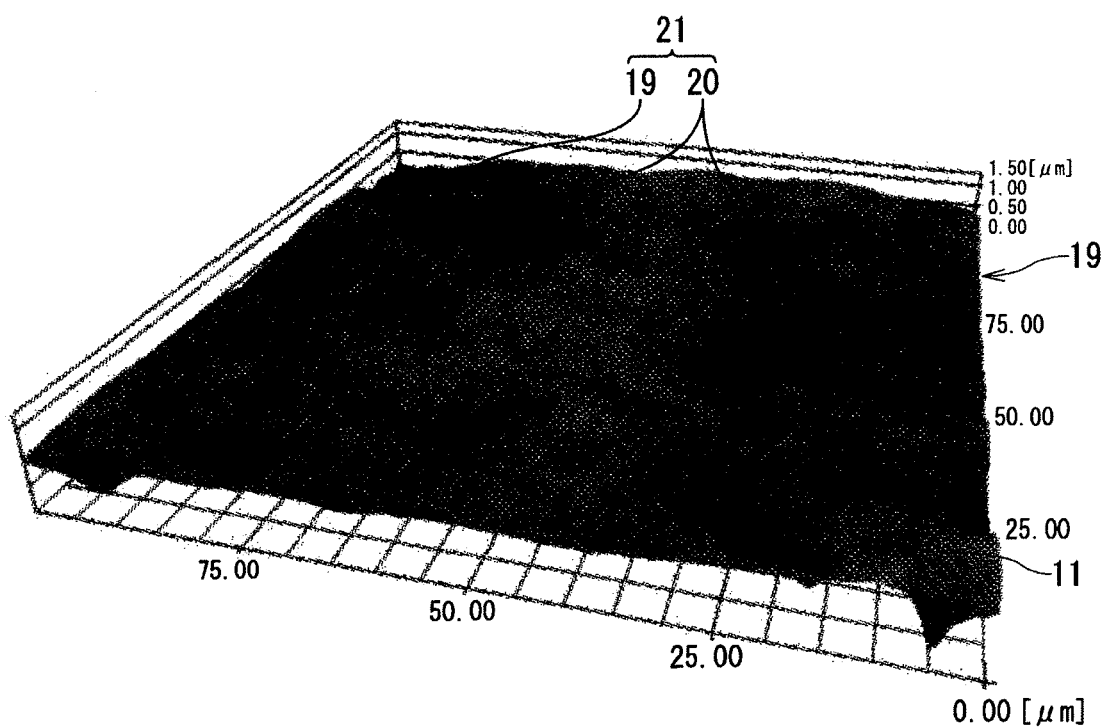
FIG. 6 is a three-dimensional image captured with an AFM (atomic force microscope) and showing a surface observation result of one of the heat-treated products in Example 1 manufactured by using the method of manufacturing a sliding member.

(2) In the heat treatment for two hours at 180° C., a surface observation result based on an AFM (atomic force microscope) image shown in FIG. 6 demonstrates that the dimples (micro-dimples) 20 were formed at random in the surface of the mixed resin and the dimples had a diameter of about 5 μm, which is substantially equal to the diameter of the spherical solid particles of the thermoplastic resin 12 mixed inside the resin surface, and had a depth of about 1 μm.

Subsequently, the liquid mixed resin 13 coated on the substrate 16 of the sliding member 15 was heat-treated at the various temperatures, and cross sections of resultant structures were observed (not shown).

(1) In the heat treatment for two hours at 140° C., the spherical solid particles made of nylon-12 (hereinafter may be referred to as nylon particles) of the thermoplastic resin 12 in the resin coating layer 19 remained as the same spherical solid particles before added and mixed. (2) In the heat treatment for two hours at 180° C., however, the nylon particles were crushed in a direction perpendicular to the substrate 16 and deformed to an elliptical form.

In the liquid-form mixed resin 13 produced by mixing the solid particles of the thermoplastic resin 12 into the thermosetting resin 11, the microdimples 20 were conceivably formed by the deformation of the solid particles of the thermoplastic resin resulting from the reversible change in volume thereof that occurred in association with the curing of the thermosetting resin 11.

As described above, by performing the heat treatment to heat the resin coating layer 19 formed by coating the liquid-form mixed resin 13 on the surface of the substrate 16 of the sliding member 15 to a temperature higher than or equal to the melting point T1 of the thermoplastic resin 12 and higher than or equal to the curing start temperature T2 of the thermosetting resin 11, the (micro) dimples 20 substantially proportionally correlated with the size of the solid particles of the thermoplastic resin 12 could be formed simultaneously in the resin coating layer 19 formed on the surface of the substrate 16 in a heat-treating process.

Therefore, as the film 21 on the substrate 16 of the sliding member 15, the resin coating layer 19 and the dimples 20 can be simultaneously formed without using any dimple forming apparatus. Furthermore, the resin coating layer 19 has not only a lubrication characteristic specific to the resin but also an excellent oil holding capability because the dimples 20 in the surface of the resin coating layer 19 function as oil reservoirs, and thereby, the sliding member 15 can provide improved seizure resistance, wear resistance, and sliding characteristics.

Example 2

In order to produce the liquid-form mixed resin 13 to be coated on the surface of the substrate 16 of the sliding member 15, the same polyamide-imide (PAI) as that in Example 1 was used as the thermosetting resin 11, and spherical solid particles made of nylon-12 (manufactured by TORAY INDUSTRIES, INC.) (grade: SP-10, average particle diameter: 10 μm) were used as the thermoplastic resin 12 to be mixed with and dispersed in the thermosetting resin 11. In one case, no solid particle of the thermoplastic resin 12 was added, and in another case, the solid particles of the thermoplastic resin 12 were added by 1, 3, 5, 9, and 17 vol %. FIGS. 7 and 8 show results of the friction coefficient and the surface roughness measured with the ball-on-disk tester with respect to the amount of added SP-10.

Figures 7A, 7B:
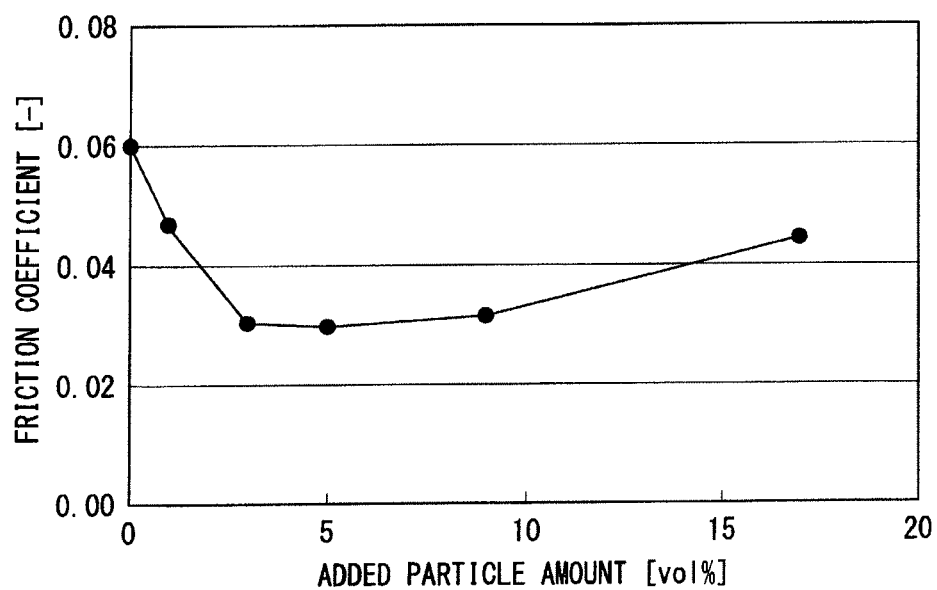
FIG. 7A shows a table containing a relationship between measured friction coefficients and an amount of added SP-10 made of nylon-12 manufactured by TORAY INDUSTRIES, INC. as the thermoplastic resin.
FIG. 7B shows a graph along which the measured values in FIG. 7A are plotted.

FIG. 7A is a table representing the measured values of the friction coefficient with respect to the amount of added SP-10, and FIG. 7B shows a graph representing the measured values.

It will be found out from FIG. 7 (FIGS. 7A and 77B) that a small friction coefficient and hence excellent sliding characteristics could be provided by the addition of the SP-10 by an amount greater than or equal to 3 vol % but smaller than or equal to 10-odd vol %.

Figures 8A, 8B:
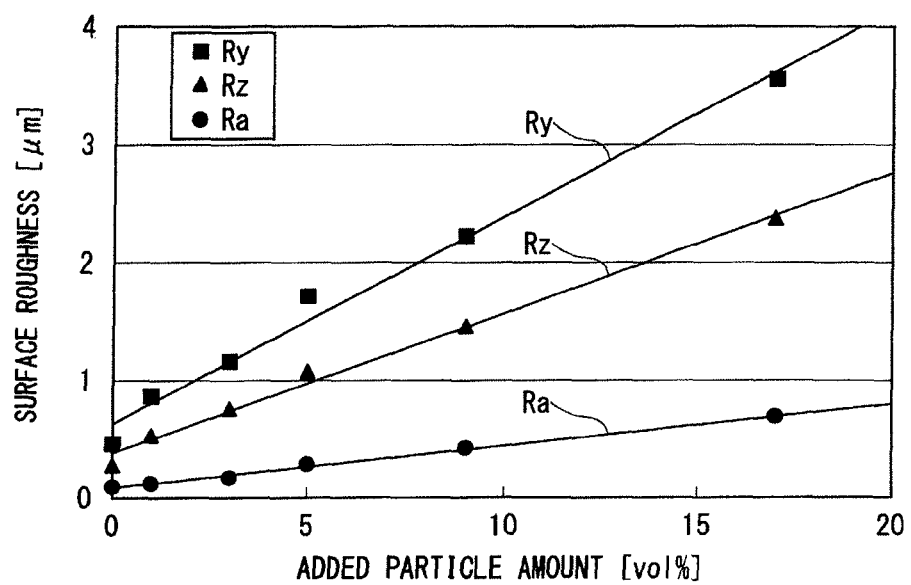
FIG. 8A shows a table containing a relationship between the measured surface roughness and the amount of added SP-10 made of nylon-12 as the thermoplastic resin.
FIG. 8B shows graphs along which the measured values in FIG. 8A are plotted.

FIG. 8 shows a relationship between the amount of added SP-10 and the surface roughness based on the JIS (B0601-1994) standard, in which FIG. 8A is a table containing measured values of the surface roughness with respect to the amount of the added SP-10, and FIG. 8B shows graphs representing the measured values.

FIG. 8 (FIGS. 8A and 8B) shows that the surface roughness, specifically, the maximum height (Ry), the 10-point average roughness (Rz), and the arithmetic average roughness (Ra) increase in substantially linear proportion to the amount of added solid particles of the thermoplastic resin.

Next, as another specific example, there will be described a case where the SP-10-graded spherical solid particles (average particle diameter: 10 μm) were added by 9 vol % as the thermoplastic resin to be mixed with and dispersed in the thermosetting resin 11, followed by a heat treatment.

In the case where the spherical solid particles of the thermoplastic resin have an average particle diameter of 10 μm, the solid particles actually provide a particle diameter ranging from 6.0 to 14.0 μM, a bulk density ranging from 2.0 to 4.0 cc/g, and a melting point ranging from 165° C. to 171° C.

The mixing method of producing the liquid-form mixed resin 13 and the method of applying the liquid-form mixed resin 13 on the substrate 16 of the sliding member 15 used in the described example were the same as those in Example 1, and the liquid-form mixed resin film 18 applied onto the substrate 16 was heat-treated for 2 hours at 180° C.

Figure 9:
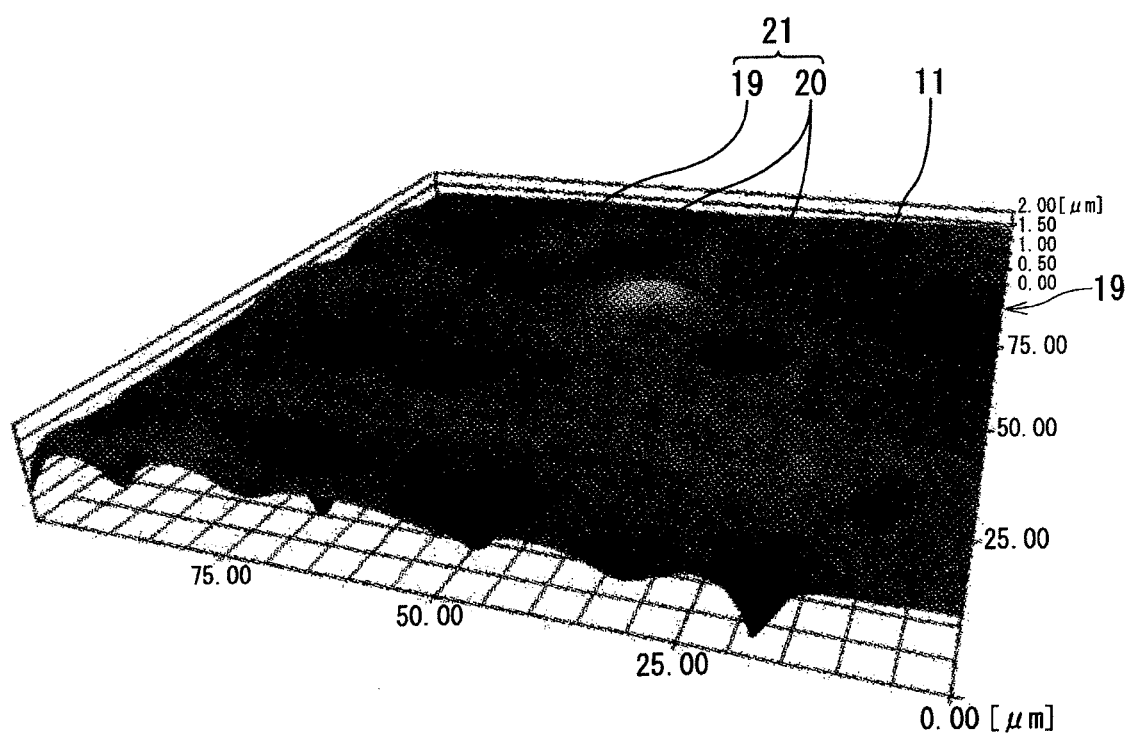
FIG. 9 is a three-dimensional image captured with an AFM and showing a surface observation result of one of the heat-treated products in Example 2 manufactured by using the method of manufacturing a sliding member.

After the liquid-form mixed resin film 18 coated on the substrate 16 of the sliding member 15 was heat-treated, (micro) dimples 20, each having a diameter of about 10 μm and a depth of about 2 μm formed in the surface of the resin coating layer 19 made of the heat-treated liquid-form mixed resin 13, were seen by surface observation based on a (three-dimensional) AFM image, as shown in FIG. 9. Cross-sectional observation of the resin coating layer 19 of the liquid-form mixed resin film 18 coated on the surface of the substrate 16 of the sliding member 15 shows dimples 20 resulting from deformation of the thermoplastic resin, as in the cross-sectional observation in Example 1.

[Relationship Between Sliding Surface and Friction Coefficient]

FIG. 10 illustrates views in which a surface state of the film 21 coated on the surface of the substrate 16 changes in accordance with the amount of added solid particles of the thermoplastic resin 12, in which FIG. 10A shows a surface state in a case where only the polyamide-imide (PAI) resin, which is the thermosetting resin, is present, and FIGS. 10B to 10F show three-dimensional AFM images of surface states in cases where SP-10-graded thermoplastic resin is added by necessary amounts to the PAI resin. In FIG. 10, FIG. 10B shows the surface state in a case where the amount of added SP-10 is 1 vol %, FIG. 10C shows the surface state in a case where the amount of added SP-10 is 3 vol %, FIG. 10D shows the surface state in a case where the amount of added SP-10 is 5 vol %, FIG. 10E shows the surface state in a case where the amount of added SP-10 is 9 vol %, and FIG. 10F shows the surface state in a case where the amount of added SP-10 is 17 vol %.

FIGS. 10A to 10F indicate that the surface state of the film 21 gradually changes from a smooth flat state to a state in which a size of irregularities (ratio of protrusions to indentations) increases as the amount of added SP-10-graded thermoplastic resin increases.

For the description of the sliding characteristics of the substrate 16, it is important to understand a Stribeck curve. The Stribeck curve can be broadly divided into the following three areas: boundary lubrication; mixed lubrication; and hydrodynamic lubrication.

When lubrication oil is present between sliding surfaces, and each of the sliding surfaces is a mirror finished surface, a thin oil film is formed between the sliding surfaces, and the friction coefficient is minimized (hydrodynamic lubrication). However, when surface pressure increases, a thickness of the oil film becomes insufficient, resulting in occurrence of solid contact and increase in friction coefficient ($\mu$) (mixed lubrication). When microdimples are present in this situation, oil held in pits is supplied to a space between the sliding surfaces and prevents the thickness of the oil film from being insufficient (prevents the friction coefficient from increasing) (hydrodynamic lubrication).

The following table shows a typical relationship between a sliding surface of a substrate and the friction coefficient.

TABLE 1

Relationship Between Sliding Surface And Friction Coefficient

| Friction Coefficient ($\mu$) | Sliding Surface | | Evaluation |
|---|---|---|---|
| | Surface Condition | (Micro) Dimple | |
| Large ↑<br><br><br><br><br><br><br><br><br>↓ Small | Rough | Not present | Because of surface roughness, solid contact occurs and friction coefficient increases |
| | | Present | Because of surface roughness, small (micro) dimple effect is achieved |
| | Smooth | Not present | Oil film is formed on sliding surface. However, when surface pressure increases, solid contact occurs |
| | | Present | Even if surface pressure increases, oil held between (micro) dimples is supplied between sliding surfaces, and friction coefficient most decreases |

In consideration of the surface conditions of the substrate 16 shown in FIG. 10, when the amount of added solid particles increases, it is considered that macroscopic surface roughness of the film (resin coat) 21 increases, and that an adverse effect of an increase in solid-contact area (real contact area) due to the increase in surface roughness on the friction coefficient becomes greater than a decreasing effect of the (micro) pits on the friction coefficient.

Example 3

In order to produce the liquid-form mixed resin 13 to be coated on the surface of the substrate 16 of the sliding member 15, the same polyamide-imide resin as that in Example 1 was used as the thermosetting resin 11, and spherical solid particles made of nylon-6 (manufactured by TORAY INDUSTRIES, INC.) (grade: TR-2) were added by 9 vol % to the thermoplastic resin 12 to be mixed with and dispersed in the thermosetting resin The spherical solid particles of the thermoplastic resin 12 have an average particle diameter ranging from 17 to 23 µm, a bulk density ranging from 2.5 to 4.5 cc/g, and a melting point ranging from 210° C. to 220° C.

The mixing method of producing the liquid-form mixed resin 13 and the method of applying the liquid-form mixed resin 13 on the substrate 16 of the sliding member 15 used in Example 3 were the same as those in Example 1. The liquid-form mixed resin 13 applied onto the substrate 16 was heat-treated or cured for 2 hours at 250° C. The temperature at which the liquid-form mixed resin 13 was heat-treated was higher than a melting point of the nylon particles of the thermoplastic resin 12 by about 30° C.

Figure 11:
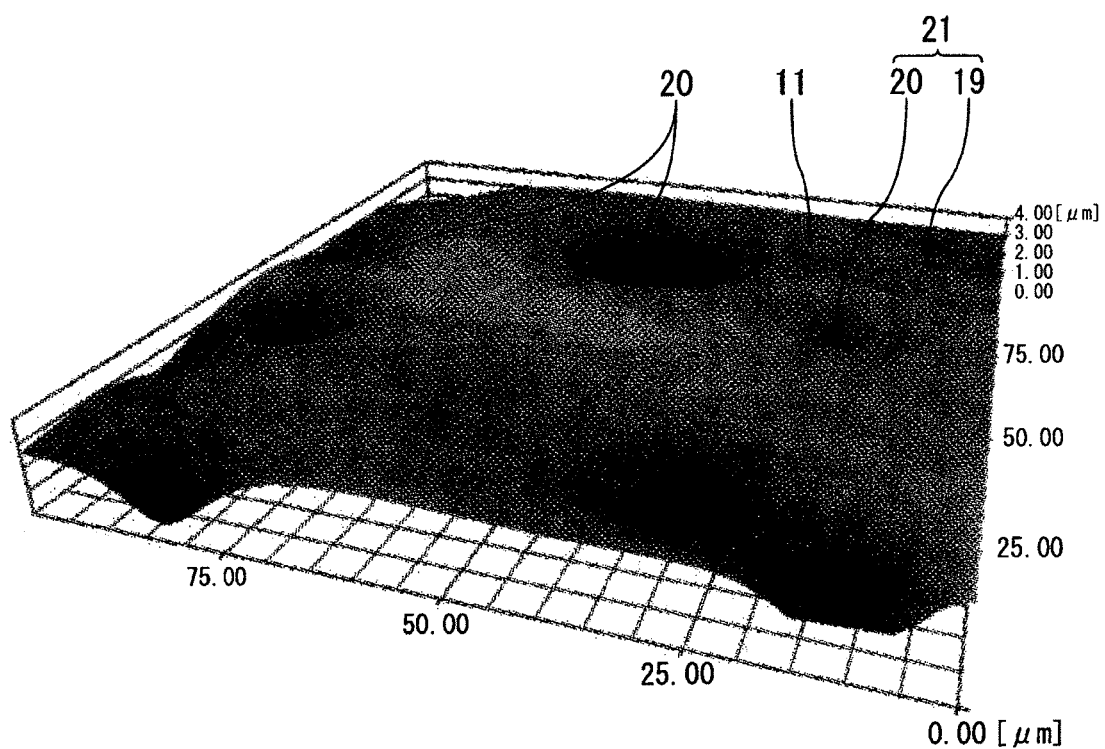
FIG. 11 is a three-dimensional image captured with an AFM and showing a surface observation result of the heat-treated product in Example 3 manufactured by using the method of manufacturing a sliding member.

FIG. 11 represents a result of AFM observation of a heat-treated product after the heat treatment of the liquid-form mixed resin 13 coated on the substrate 16 of the sliding member 15. Dimples 20, each having a diameter of about 20 µm and a depth of about 4 µm formed in the resin surface of the resin coating layer 19 on the substrate 16 which was subjected to the heat treatment, were observed.

In cross-sectional observation, deformation of part of the added nylon particles of the thermoplastic resin 12 is observed, but an amount of deformation was greater than those in Examples 1 and 2 and a deformed shape is not uniform but distorted. The reason for this matter is supposed due to a fact that the heat treatment was performed at a temperature higher than the melting point of the thermoplastic resin by about 30° C., which is a relatively large temperature difference, resulting in an increase in fluidity, and hence, an increase in the amount of deformation as compared with those in Examples 1 and 2.

Figure 12:
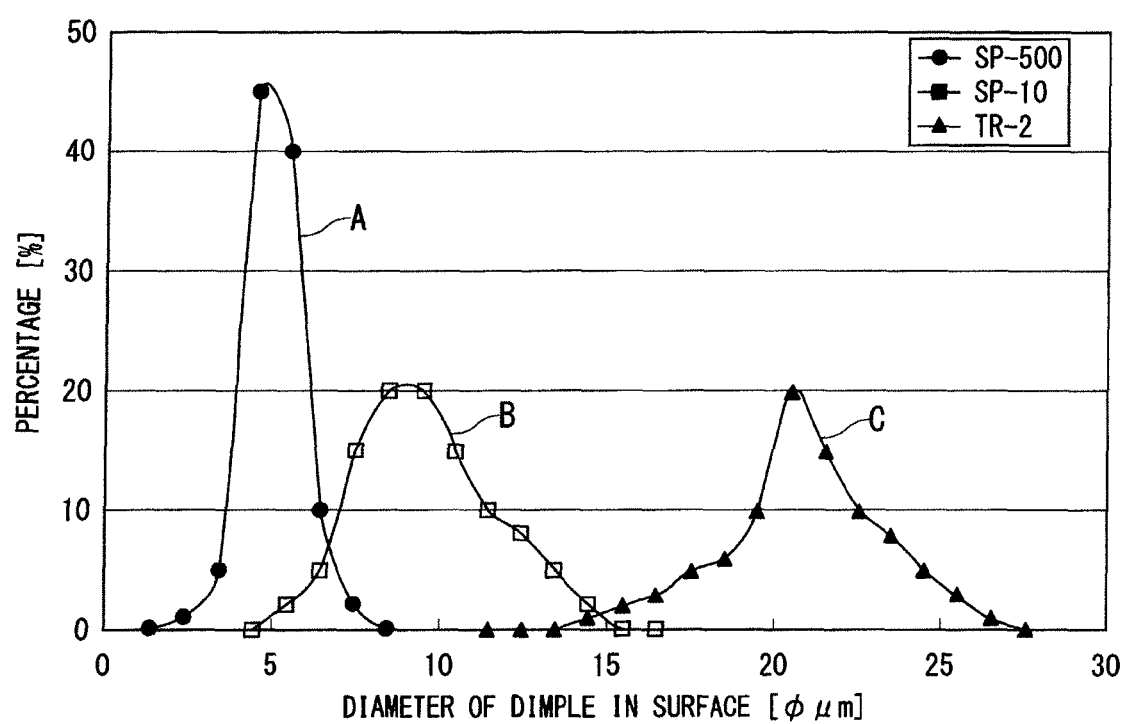
FIG. 12 shows graphs illustrating a relationship between a diameter of the dimples in resin surfaces of the heat-treated products determined based on the AFM images in Examples 1 to 3 and a proportion of the dimples.

As a result of consideration of the surface states of the films formed in Examples 1 to 3 observed under an AFM, FIG. 12 shows a graph representing a relationship between a microdimple diameter $\phi$ (µm) determined based on the AFM images and a proportion of the microdimples (vol %).

It will be confirmed from FIG. 12 and based on the analysis and measurement of the AFM images that the shape of the microdimples formed in the surface of the resin coating layer of each of the films is greatly and proportionally correlated with the shape of the spherical solid particles of the thermoplastic resin 12 in the thermosetting resin 11.

In FIG. 12, reference character A denotes a distribution of the diameter of the dimples in a case where the SP-500-graded solid (nylon-12) particles were added to the thermoplastic resin 12. Reference character B denotes a distribution of the diameter of the dimples in a case where the SP-10-graded solid (nylon-12) particles were added to the thermoplastic resin 12. Reference character C denotes a distribution of the diameter of the dimples in a case where the TR-2-graded solid (nylon-6) particles were added to the thermoplastic resin 12.

<Relationship Between Diameter of Dimples and Diameter of Solid Particles of Thermoplastic Resin>

The liquid-form mixed resin 13, which is a mixture of a thermoplastic resin with a thermosetting resin, is coated on the substrate 16 and heat-treated (cured) to form the film 21 made of the mixed resin on the substrate 16. It was confirmed whether or not there is a range of the particle diameter over which the dimple diameter of the dimples 20 formed in the surface of the film on the substrate 16 is substantially equal to the particle diameter of the solid particles of the thermoplastic resin 12 added was tested and checked by using solid particles made of nylon-12 manufactured by Daicel-Evonik Ltd. (grade: VESTOSINT 1111, VESTOSINT 2157) as the thermoplastic resin 12 as in Examples 1 to 3.

Figure 13:
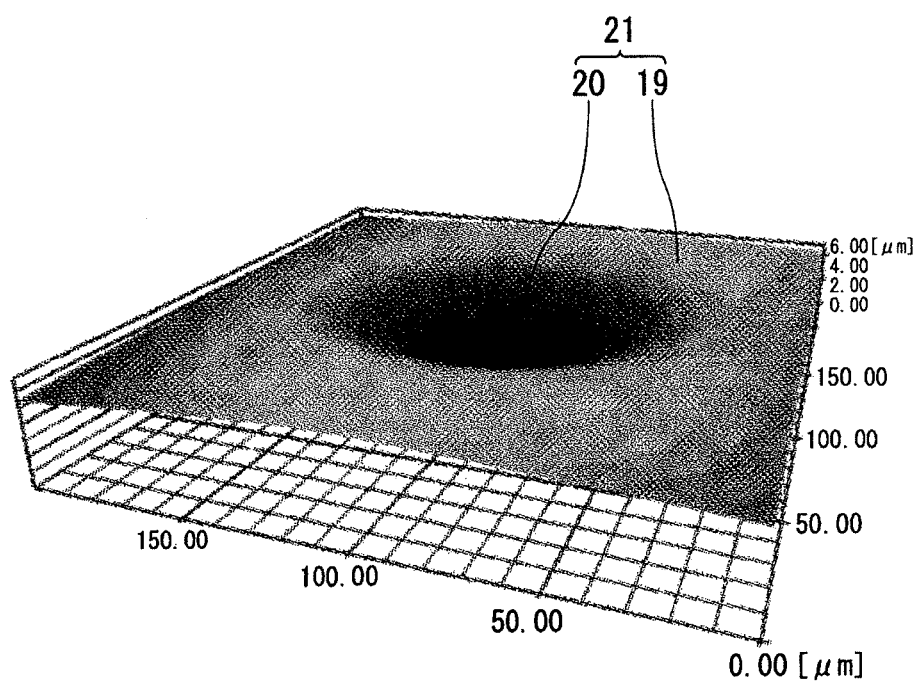
FIG. 13 is a three-dimensional image captured with an AFM and showing a result of surface observation of a dimple formed in a resin coating layer of a film in a case where solid particles having a particle diameter ranging from 60 to 150 μm are used as the thermoplastic resin.
Figure 14:
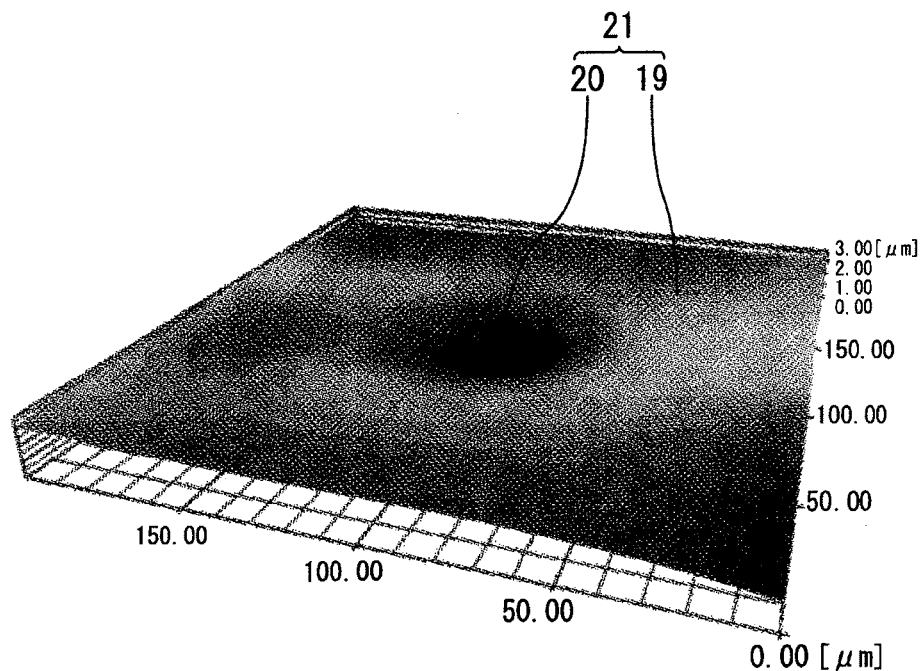
FIG. 14 is a three-dimensional image captured with an AFM and showing a result of surface observation as in FIG. 13 but in a case where solid particles having an average particle diameter of 50 μm are used as the thermoplastic resin.

The checking was performed by using solid particles made of nylon-12 manufactured by Daicel-Evonik Ltd. and having an average particle diameter of at least 50 μM as the solid particles of the thermoplastic resin 12. Surface observation of the film 21 under an AFM was performed and three-dimensional images were produced as shown in FIGS. 13 and 14. It was confirmed from the analysis of the images that the film 21 has recesses (dimples) formed in the surface of the resin coating layer 19 and corresponding to the particle diameter of the solid particles even when the VESTOSINT-1111-graded solid particles having a solid particle diameter ranging from 60 to 150 μm were used and even when the VESTOSINT-2157-graded solid particles having an average particle diameter of about 50 μm (smaller than or equal to 100 μm) were used, as shown in FIG. 13.

It is therefore confirmed that the dimples 20 in the film 21 that are produced by coating the liquid-form mixed resin 13, which is a mixture of the thermosetting resin 11 with the thermoplastic resin 12, followed by heat treatment (heat-treating process) can be formed simultaneously with the formation of the resin coating layer 19, and that the diameter of the dimples 20 is proportionally correlated with the particle diameter of the solid particles even when the average particle diameter of the solid particles of the thermoplastic resin added is 50 μm or greater.

<Conditions Necessary for Forming Resin Coating Layer and Dimples>

Finally, conditions necessary for forming the (micro) dimples 20 in the film 21, which is coated and then heat-treated (cured) on the surface of the substrate 16, simultaneously with the formation of the resin coating layer 19, will be described hereunder.

The following items need to be satisfied as a summary of the conditions necessary for forming the (micro) dimples 20 in the film 21 simultaneously with the formation of the resin coating layer 19.

1. A mixture of the thermosetting resin 11 and the thermoplastic resin 12 is to be used.

Each of the thermosetting resin 11 and the thermoplastic resin 12 to be used is not limited to one type. For example, the thermoplastic resin 12 to be added may be formed of a plurality of (for example, several types of) resins.

2. The thermosetting resin 11 before mixed is a resin material in a form of liquid that cures when heated.

3. The thermoplastic resin 12 before mixed is in a form of solid particles.

The thermoplastic resin 12 is formed of solid particles, and spherical particles are preferable because of excellence when they are uniformly mixed with and dispersed in the thermosetting resin 11.

4. The melting point (T1) of the thermoplastic resin and the curing temperature (T2) of the thermosetting resin satisfy an equation $T1<T2$.

A mixed resin (mixture) produced by mixing the thermosetting resin 11 with the thermoplastic resin 12 is heat-treated at a temperature higher than or equal to the melting point T1 of the thermoplastic resin and higher than or equal to the curing temperature T2 of the thermosetting resin.

5. A temperature at which the mixture is heat-treated (heat-treating temperature) (T3) is related to the curing temperature (T2) of the thermosetting resin 11 and the melting point (T1) of the thermoplastic resin 12 as follows: $T2 \leq T3 < T1+50°$ C.

By performing the heat treatment to the thermoplastic resin 12 dispersed in the thermosetting resin 11 at the heat treatment temperature T3, the solid particles of the thermoplastic resin 12 are deformed, and in the dimple formation in which the dimples are formed on the surface of the thermosetting resin, it is required that the heat treatment is performed at a temperature higher than or equal to the melting point T1 of the thermoplastic resin 12, where the solid particles of the thermoplastic resin 12 undergo a reversible change in volume, and higher than or equal to the curing temperature T2 of the thermosetting resin 11.

In the case when the temperature T3 at which the mixture (mixed resin) is heat-treated is higher than the melting point T1 of the thermoplastic resin 12 by 50° C., that is, when the heat treatment is performed at a heat treatment temperature of T3 ($T3>T1+50°$ C.), the deformation or fluidity of the thermoplastic resin 12 increases, and hence, intended dimples are not formed in the resin surface.

In the process described above, the shape and size of the dimples formed in the resin surface of the mixture (mixed resin) are defined (or determined) by the shape and particle diameter of the solid particles of the thermoplastic resin 12 dispersed in the liquid-form thermosetting resin before being mixed. When the solid particles have a spherical shape, substantially circular or elliptical dimples are produced. Further, a distribution of the dimples formed in the resin surface of the mixture is defined (or determined) by the amount of added thermoplastic resin 12.

Furthermore, since the shape and size of the dimples formed in the resin surface of the mixture (mixed resin) are defined (or determined) by the size and shape of the solid particles of the thermoplastic resin 12 to be mixed, and the distribution of the dimples is defined (or determined) by the amount of added thermoplastic resin 12, the size and distribution of the dimples 20 can be appropriately set based on a sliding speed, a load, a viscosity of a lubricant, such as lubrication oil, and a variety of other conditions, thereby improving the sliding characteristics of the film 21 having the dimples 20.

Further, the resin coating layer 19 and the dimples 20 can be simultaneously formed in the film 21 without using a separate dimple forming apparatus on the resin surface of the mixture (mixed resin), whereby not only the inherent sliding characteristics of the resin are improved, but also the sliding characteristics are further improved by an effect as oil reservoir under an oil lubrication condition.

The present invention is not limited to the embodiments described above, and other variations and modifications may be made without departing from the scope of the appended claims.

REFERENCE NUMERALS

10 - - - container
11 - - - thermosetting resin
12 - - - thermoplastic resin
13 - - - liquid-form mixed resin
15 - - - sliding member
16 - - - substrate
18 - - - liquid-form mixed resin film
19 - - - resin coating layer
20 - - - dimple (micro-dimple)
21 - - - film

The invention claimed is:

1. A sliding member comprising:
   a substrate; and
   a coating on a surface of the substrate, the coating made of a mixed resin that is a mixture of a thermosetting resin and a thermoplastic resin,
   wherein the mixed resin is a mixture of a thermosetting resin in a form of liquid before mixing and a thermoplastic resin in a form of solid particles before mixing, and the liquid-form mixed resin is coated and then heat-treated to thereby form a film formed of a resin coating layer and dimples formed in a resin surface, wherein the mixed resin is a mixture produced by uniformly mixing solid particles made of nylon-12 thermoplastic resin in a polyamide-imide-based thermosetting resin.

2. The sliding member of claim 1, wherein the mixed resin coated on the surface of the substrate is heat-treated at a temperature higher than or equal to a melting point of the thermoplastic resin and higher than or equal to a curing temperature of the thermosetting resin.

3. The sliding member of claim 1, wherein a shape of the dimples formed in the surface of the resin coating layer is defined or determined by a size and a shape of the solid particles of the thermoplastic resin.

4. The sliding member of claim 1, wherein a distribution of the dimples formed in the surface of the resin coating layer is defined or determined by an amount of solid particles of the thermoplastic resin to be added.

5. The sliding member of claim 1, wherein the solid particle of the thermoplastic resin has a spherical shape.

\* \* \* \* \*